US009143620B2

(12) United States Patent
Somes et al.

(10) Patent No.: US 9,143,620 B2
(45) Date of Patent: Sep. 22, 2015

(54) MULTIPARTY SERVICE ACCESS IN A NETWORK WITH AUTONOMOUS NODES

(75) Inventors: Brian Edmund Somes, Garland, TX (US); Jeffrey Allen Haltom, Fishers, IN (US); Rachel Lee Scarbrough, Plano, TX (US); Heath William Hendrickson, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 539 days.

(21) Appl. No.: 13/418,740

(22) Filed: Mar. 13, 2012

(65) Prior Publication Data

US 2013/0243171 A1 Sep. 19, 2013

(51) Int. Cl.
*H04M 7/00* (2006.01)
*H04M 7/12* (2006.01)

(52) U.S. Cl.
CPC .............. *H04M 7/006* (2013.01); *H04M 7/128* (2013.01)

(58) Field of Classification Search
CPC H04M 2203/5018; H04M 3/56; H04M 3/567
USPC ................................... 348/14.08; 379/202.01
See application file for complete search history.

(56) References Cited

U.S. PATENT DOCUMENTS

| | | | |
|---|---|---|---|
| 7,974,394 B1* | 7/2011 | Cao et al. | 379/133 |
| 2004/0085914 A1* | 5/2004 | Baxley et al. | 370/260 |
| 2004/0246332 A1* | 12/2004 | Crouch | 348/14.08 |

* cited by examiner

*Primary Examiner* — Amal Zenati

(57) ABSTRACT

Methods, devices, and storage media provide for receiving a request to use a multiparty service offered by autonomous devices; determining whether persistence information exists that indicates one of the autonomous devices to which the request is to be routed; selecting one of the autonomous devices to transmit the request in response to determining that persistence information does not exist, and wherein the device has no knowledge which of the autonomous devices is to accept the request; transmitting the request; receiving a response; recognizing whether the request is accepted based on the response; storing persistence information indicating the one of the autonomous devices is servicing the request; and using the persistence information to transmit a subsequent request to use the multiparty service to the one of the autonomous devices, wherein the subsequent request pertains to a same session of the multiparty service as the request.

20 Claims, 11 Drawing Sheets

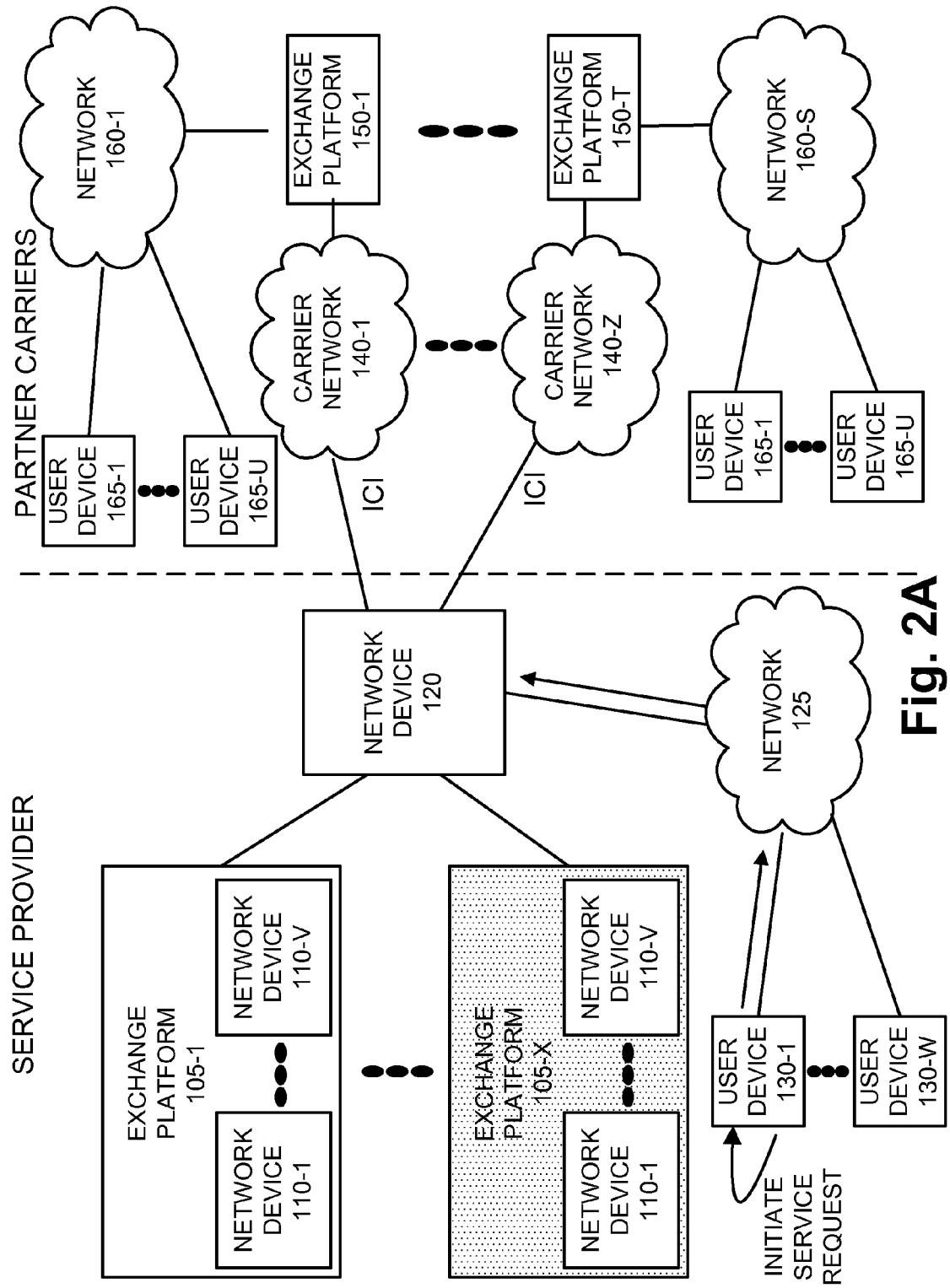

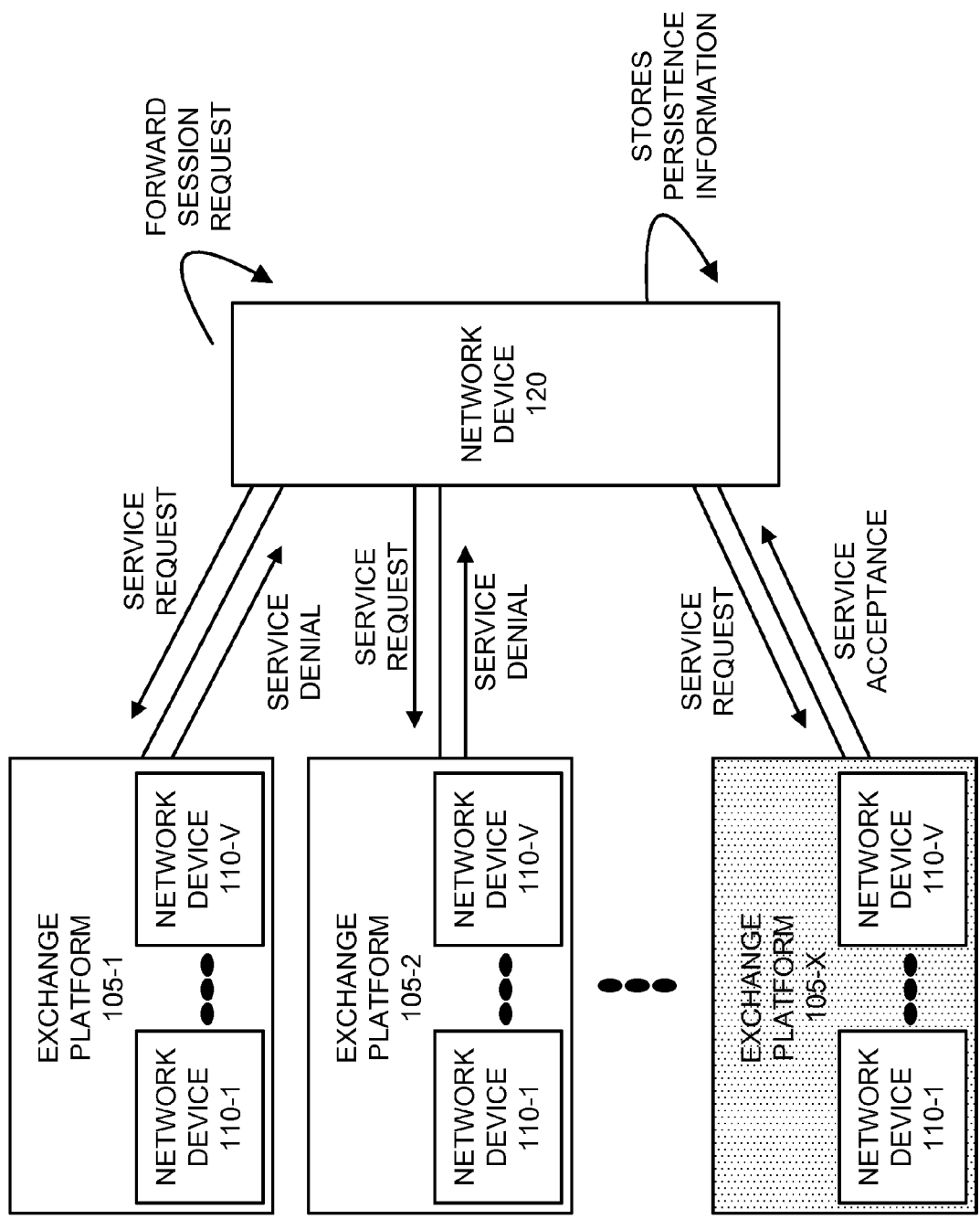

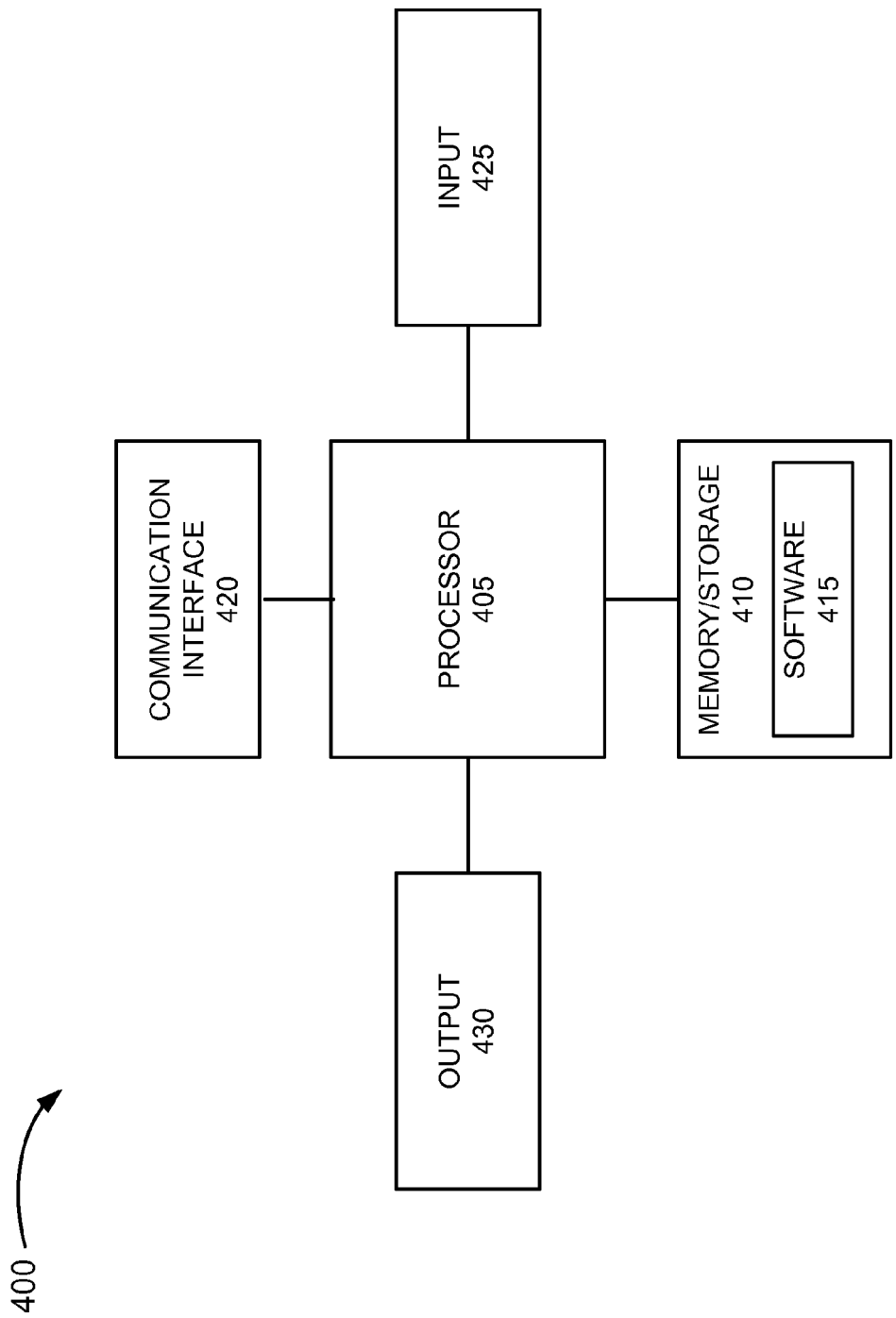

MULTIPARTY SERVICE ACCESS IN A NETWORK WITH AUTONOMOUS NODES

BACKGROUND

A multiparty service, such as a conferencing service or a telepresence service, provides the service to multiple users that are located at multiple locations. According to some multiparty service architectures, the service is provided across multiple exchanges in which each exchange operates autonomously.

DESCRIPTION OF THE DRAWINGS

FIGS. 2A-2D illustrate an exemplary process for delivering a multiparty service provided by autonomous network devices in the environment depicted in FIG. 1;

FIG. 4 is a diagram illustrating exemplary components of a device that may correspond to one or more of the devices in the environment depicted in FIG. 1.

DETAILED DESCRIPTION

Figure 1:
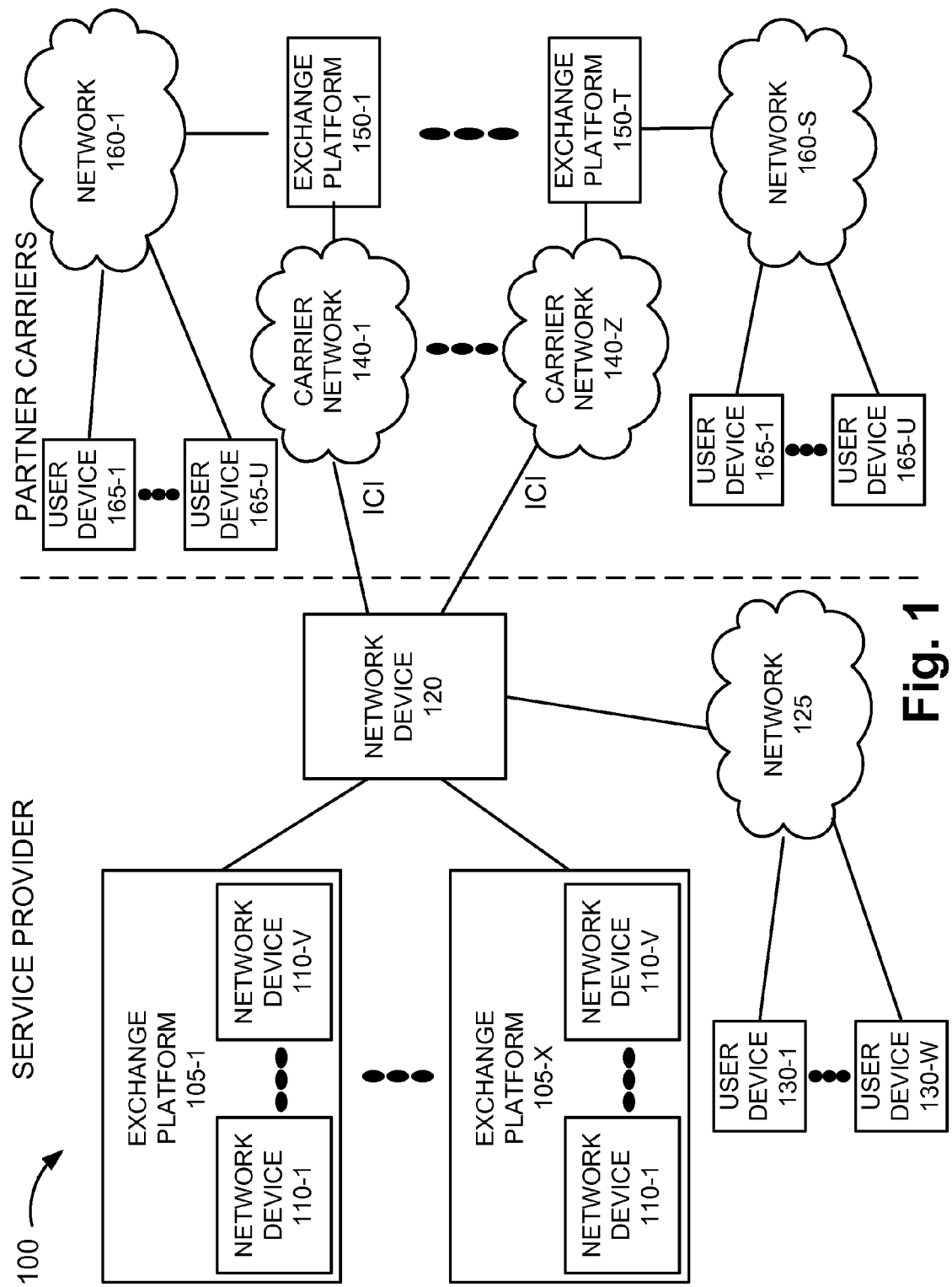
FIG. 1 is a diagram illustrating an exemplary environment in which an exemplary embodiment of delivering a multiparty service provided by autonomous network devices may be implemented.

The following detailed description refers to the accompanying drawings. The same reference numbers in different drawings may identify the same or similar elements.

According to some service providers with deployed multiparty service architectures, the service is provided across exchange platforms that each operate autonomously. By way of example and with reference to a telepresence service, each exchange platform provides video bridging and call processing services. Hosted customers' and partner carriers' architectures are configured to route initial service requests to a specific network device that is communicatively coupled to the exchange platforms. For example, the network device may be implemented as a load balancer device. Based on this framework, if an initial service request is unsuccessful because the telepresence service is not hosted by the exchange platform with which the network device (e.g., a load balancer device) initially communicates, a concatenation of hunt-peck routing ensues, by the network device, to discover the exchange platform that is hosting the telepresence service session.

When a multiparty service session (e.g., a telepresence session) is scheduled, the scheduling logic sets up the multiparty service session on any of the exchange platforms. Additionally, the service session may be moved or re-established to another exchange platform, in real-time, if the hosting exchange platform fails. Unfortunately, while the scheduling logic recognizes all of the exchange platforms (e.g., from a routing perspective), the customers' and partner carriers' architectures trying to reach and use the multiparty service do not have any global routing knowledge as to which exchange platform is hosting the scheduled service session. Furthermore, each exchange platform recognizes and provides the multiparty service only for sessions on which the session has been established or set up, and rejects and/or reroutes service requests for sessions on which the sessions have not been established or set up.

With reference to partner carrier networks that include exchange platforms that host a multiparty service, the network device has no knowledge which of the exchange platforms of the partner carrier's network is hosting the multiparty service for a given service request. As a result, error messages (e.g., Session Initiation Protocol (SIP) 404 messages) are returned, in response to unsuccessful service requests, and subsequent IP addresses associated with other exchange platforms are attempted to locate the correct exchange platform.

Additionally, in some cases, partner carriers request similar configurations from the service provider. In other cases, some partner carriers daisy-chain their exchange platforms, such that service requests to one exchange platform fail over to a concatenation of other exchange platforms, until the correct exchange platform is reached.

The multiparty service architecture, described above, does not include an overriding intelligence (e.g., global query, proxy and/or redirect, ENUM, etc.) to direct a service request to a correct session-owning exchange platform on the first attempt. While improved routing intelligence may be used in the future, such implementations come with substantial costs, such as new equipment, software, etc., along with increased complexity and issues pertaining to inter-carrier routing data coordination. Additionally, vendors will have to re-engineer multiparty service platforms to change from an enterprise-based implementation (e.g., as if used by a single client) to a more common, multi-tenant environment.

According to an exemplary embodiment, a network device routes user requests to a multiparty service or a multiparty application (subsequently described as a multiparty service) that is offered by autonomous or independent devices of a network. According to an exemplary implementation, the multiparty service includes a conferencing service (e.g., a telephone conferencing service, a video conferencing service, a telepresence service). Alternatively, the multiparty service may include another type of service (e.g., a gaming service, etc.) that allows multiple users to participate in a service session at different locations, and the service session is active, exists, and/or hosted at only one of the autonomous devices. According to an exemplary embodiment, the network device includes a load balancer device and/or includes a network device having application delivery controller capabilities.

According to an exemplary embodiment, the network device captures and stores information from a successful routing of one of the service requests to the multiparty service (e.g., to an autonomous device hosting a multiparty service session). According to an exemplary embodiment, the network device uses the information to create a global persistence for routing subsequent service requests to the multiparty service (e.g., the same autonomous device hosting the multiparty service session).

While exemplary embodiments provided in this description may be implemented based on the use of a particular protocol, device, network architecture, platform, etc., such implementations are not intended to be restrictive or provide an exhaustive treatment, as such. In other words, the embodiments described herein may be implemented using other suitable protocols, devices, network architectures, platforms, etc., which may not be specifically described.

FIG. 1 is a diagram illustrating an exemplary environment in which an exemplary embodiment of delivering a multiparty service provided by autonomous network devices may be implemented. As illustrated, environment 100 includes exchange platforms 105-1 through 105-X, in which X>1 (also referred to collectively as exchange platforms 105 or individually as exchange platform 105). Exchange platform 105 includes network devices 110-1 through 110-V, in which V>1 (also referred to collectively as network devices 110 or individually as network device 110). As further illustrated, environment 100 includes a network device 120, a network 125, user devices 130-1 through 130-W, in which W>1 (also referred to collectively as user devices 130 or individually as user device 130), carrier networks 140-1 through 140-Z, in which Z>1 (also referred to collectively as carrier networks 140 or individually as carrier network 140), exchange platforms 150-1 through 150-T, in which T>1 (also referred to collectively as exchange platforms 150 or individually as exchange platform 150), networks 160-1 through 160-S, in which S>1 (also referred to collectively as networks 160 or individually as network 160), and user devices 165-1 through 165-U, in which U>1 (also referred to collectively as user devices 165 or individually as user device 165). Environment 100 is illustrated as being divided into a service provider side and a partner-carrier side.

The number of devices and the configuration in environment 100 are exemplary and provided for simplicity. According to other embodiments, environment 100 may include additional devices, fewer devices, different devices, and/or differently arranged devices, than those illustrated in FIG. 1. Additionally, the number of networks in environment 100 is exemplary and provided for simplicity.

According to other embodiments, a single device in FIG. 1 may be implemented as multiple devices and/or multiple devices may be implemented as a single device. For example, network device 120 may be implemented as multiple network devices. A device may be implemented according to one or multiple network architectures (e.g., a client device, a server device, a peer device, or a combination thereof).

Also, according to other embodiments, one or more functions and/or processes described as being performed by a particular device may be performed by a different device, or some combination of devices, which may or may not include the particular device. Environment 100 may be implemented to include wired and/or wireless connections among the devices illustrated.

Exchange platform 105 includes an autonomous system that provides a multiparty service. According to an exemplary embodiment, the multiparty service includes a telepresence service. According to other embodiments, exchange platform 105 may be implemented to provide other types of multiparty services. According to an exemplary embodiment, exchange platform 105 operates autonomously in relation to other exchange platforms 105, as described herein. Exchange platform 150 includes a system that provides a multiparty service. Although not illustrated, exchange platform 150 also includes network devices 110.

Network devices 110 include application devices, session border controller devices, and other types of network devices to provide the multiparty service. For example, the application devices include telepresence video communication servers and a communications manager. The session border controller devices may include aggregation services routing functionality, and other network devices may provide communication management functionality, multipoint switching, etc., pertaining to the multiparty service. According to an exemplary implementation, a customer's or a partner carrier access to the multiparty service of exchange platform 105 and/or exchange platform 150 is provided via the session border controller devices.

Network device 120 includes a network device capable of routing service requests to exchange platforms 105 and 150. According to an exemplary embodiment, network device 120 is implemented as a load balancer device. According to an exemplary embodiment, network device 120 includes application delivery control functionality. Additionally, according to an exemplary embodiment, network device 120 stores persistence information when a service request is successfully routed to a hosting exchange platform. Network device 120 is described further below.

Network 125 includes one or multiple networks of one or multiple types. Network 125 provides users of user device 130 access to the multiparty service. Network 160 provides users of user devices 165 access to the multiparty service. For example, network 125 and network 160 may include a local area network, a metropolitan network, a wide area network, an IP network, an Integrated Services Digital Network (ISDN) network, a mobile network, a wired network, or other suitable network.

User device 130 includes a device that allows a user to use the multiparty service. For example, with reference to a telepresence video conferencing service, user device 130 includes a display, a microphone, a speaker, a camera, and a user interface. User device 130 may be implemented as a mobile device or a stationary device. User device 160 includes a device similar to user device 130.

Carrier network 140 includes one or multiple networks of one or multiple types. Carrier network 140 provides carrier access to the multiparty service provided on the service provide side of environment 100. For example, carrier network 140 may include an IP network and/or a Multiprotocol Label Switching (MPLS) network. As illustrated in FIG. 1, carrier network 140 is communicatively coupled to network device via an inter-carrier interconnect.

Figure 2C:
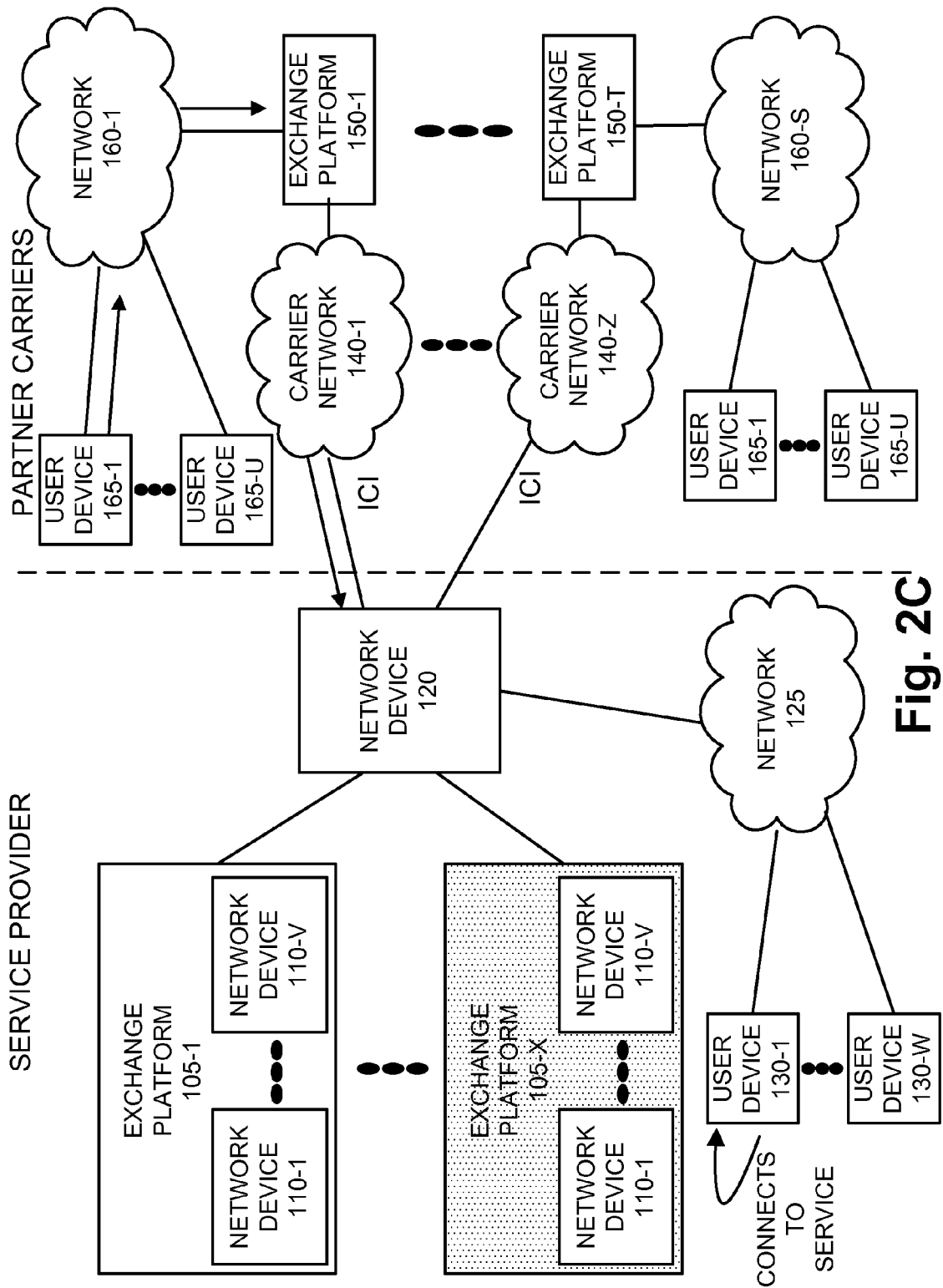

FIGS. 2A-2D illustrate an exemplary process for delivering a multiparty service provided by autonomous network devices. According to an exemplary scenario, assume that exchange platform 105-X is hosting a telepresence video conference that was previously set up. Referring to FIG. 2A, a user initiates, via user device 130-1, a service request to participate in the video conference. The service request is received by network device 120. According to an exemplary implementation, the service request includes, among other data or information, a telephone number and a pin number.

Referring to FIG. 2B, in response to receiving the service request, network device 120 load balances the service request across the exchange platforms 105. For example, network device 120 may store an exchange platform pool of IP addresses. Additionally, for example, network device 120 may store a network device pool of IP addresses (e.g., SBC pool, application server pool) for each exchange platform 105. Network device 120 forwards the session request (e.g., as a SIP invite message) to exchange platforms 105 until a successful session response is obtained. By way of example, as illustrated in FIG. 2B, in response to receiving the service request, and in view of load-balancing considerations, network device 120 selects exchange platform 105-1 and network device 110-V to which to transmit the session request. Network device 110-V performs a lookup (e.g., based on the telephone number and the pin number) and recognizes that network device 110-V and/or exchange platform 105-1 is not hosting this particular video conference. In response, a service denial response (e.g., a SIP 404 message) is transmitted to network device 120. As further illustrated, network device 120 transmits a service request to exchange platform 105-2. However, exchange platform 105-2 responds with a service denial response.

Subsequently, network device 120 transmits a service request to exchange platform 105-X. In response, exchange platform 105-X responds with a service acceptance message (e.g., a SIP 200 message) since the exchange platform 105-X is hosting the telepresence video conference. In response to receiving this message, network device 120 stores persistence information pertaining to the successful routing of the service request to exchange platform 105-X. By way of example, network device 120 may store a data structure or a database that correlates a unique instance of the multiparty service (e.g., the telephone number and the pin number) with the hosting exchange platform (e.g., an IP address, an identifier associated with exchange platform 105-X (e.g., a routing group of the load-shared session border controller devices, etc.), and/or Session Description Protocol IP port information). As described further below, network device 120 may create a global, persisting routing class that subsequent service requests that are trying to join the same instance or session of the multiparty service, as the successfully terminated service request, may be routed appropriately (e.g., to the same successful routing group pointing to the session border controller devices of exchange platform 105).

Figure 2D:
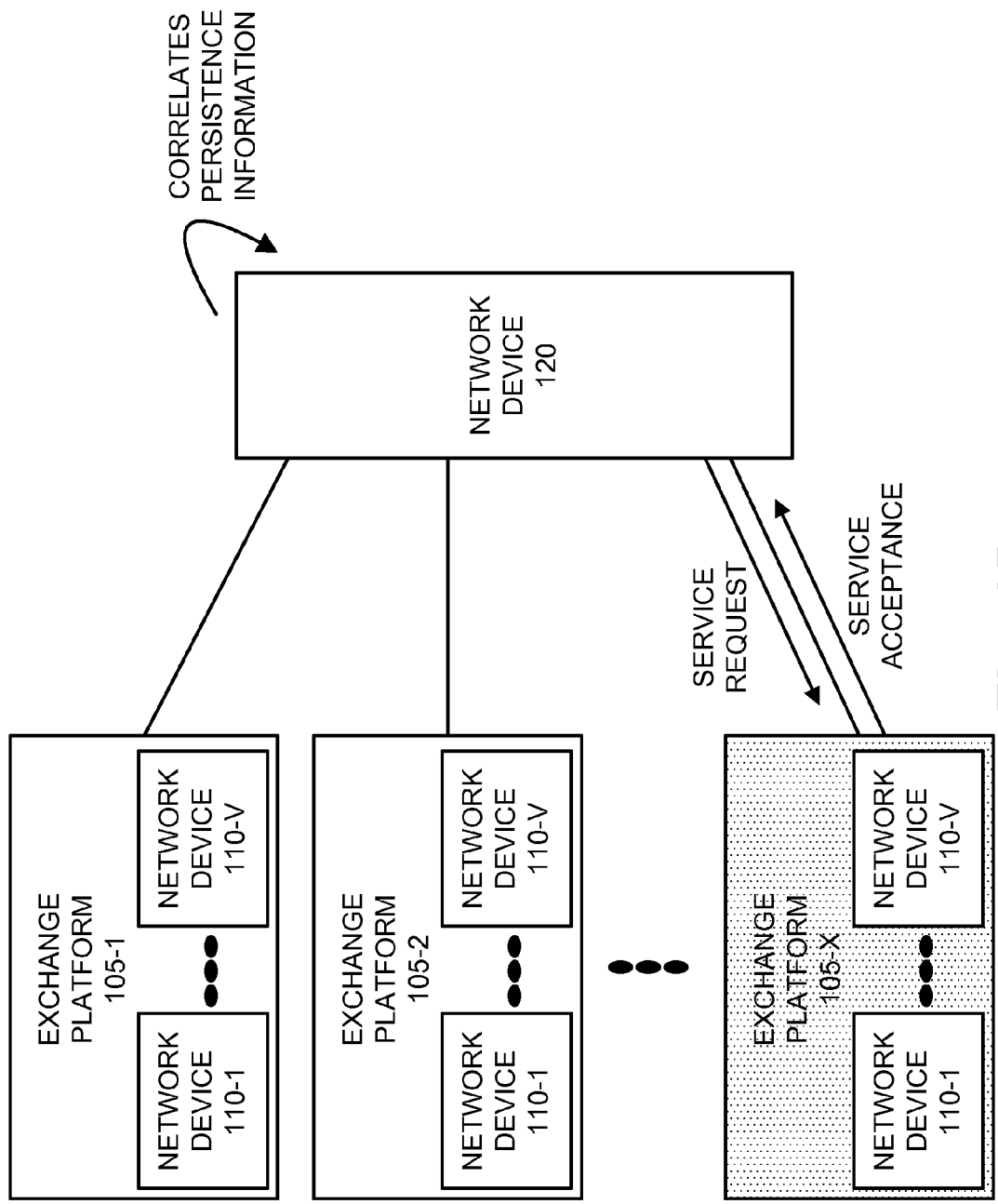

Referring to FIG. 2C, user device 130-1 connects to the multiparty service. A user initiates, via user device 165-1, a service request to network device 120. In response to receiving the service request, network device 120 correlates the service request with the stored persistence information, as illustrated in FIG. 2D. For example, the service request includes the telephone number and the pin number which are used by network device 120 to correlate the service request to hosting exchange platform 105-X. Network device 120 transmits a service request, in view of load-balancing considerations, to exchange platform 105-X. In response, network device 120 receives a service acceptance message.

According to the scenario described and illustrated in relation to FIGS. 2A-2D, network device 120 routes service requests directly to the hosting exchange platform 105 based on the stored persistence information. According to another embodiment, exchange platform 105 may communicate with a multiparty service reservation platform (e.g., that includes a scheduling database, etc.) to obtain information pertaining to which exchange platform is hosting the telepresence video conference. By way of example, referring back to FIG. 2B, in response to receiving the initial service request, network device 110-V (e.g., an application server) of exchange platform 105-1 performs a lookup to determine whether exchange platform 105-1 is hosting the video conference. According to this scenario, assume that exchange platform 105-1 is not hosting the video conference. In response to recognizing that exchange platform 105-1 is not hosting the video conference, network device 110-V transmits a request to the multiparty service reservation platform (not illustrated) to obtain information pertaining to which exchange platform 105 is hosting the video conference. For example, the request includes the telephone number and the pin number. The multiparty service reservation platform performs a lookup and transmits a response indicating that exchange platform 105-X is hosting the video conference.

Network device 110-V of exchange platform 105-1 transmits a service response to network device 120. For example, the service response may be implemented as a SIP message (e.g., a 3XX redirect message) indicating that exchange platform 105-X is hosting the video conference. In response, network device 120 transmits a service request to exchange platform 105-X and receives a service acceptance response. Network device 120 stores the persistence information and subsequent service requests for joining the video conference session are routed to exchange platform 105-X. According to yet another embodiment, network device 120 may transmit a request to the multiparty service reservation platform, in response to a service request that is received when persistence information is not available. For example, when network device 120 receives the service request from user device 130-1, network device 120 determines that persistence information does not exist, and queries the multiparty service reservation platform.

Described below is another exemplary scenario in which a multiparty service is managed by network device 120. According to this exemplary scenario, the hosting exchange platform is in a partner carrier's network.

Figure 3A:
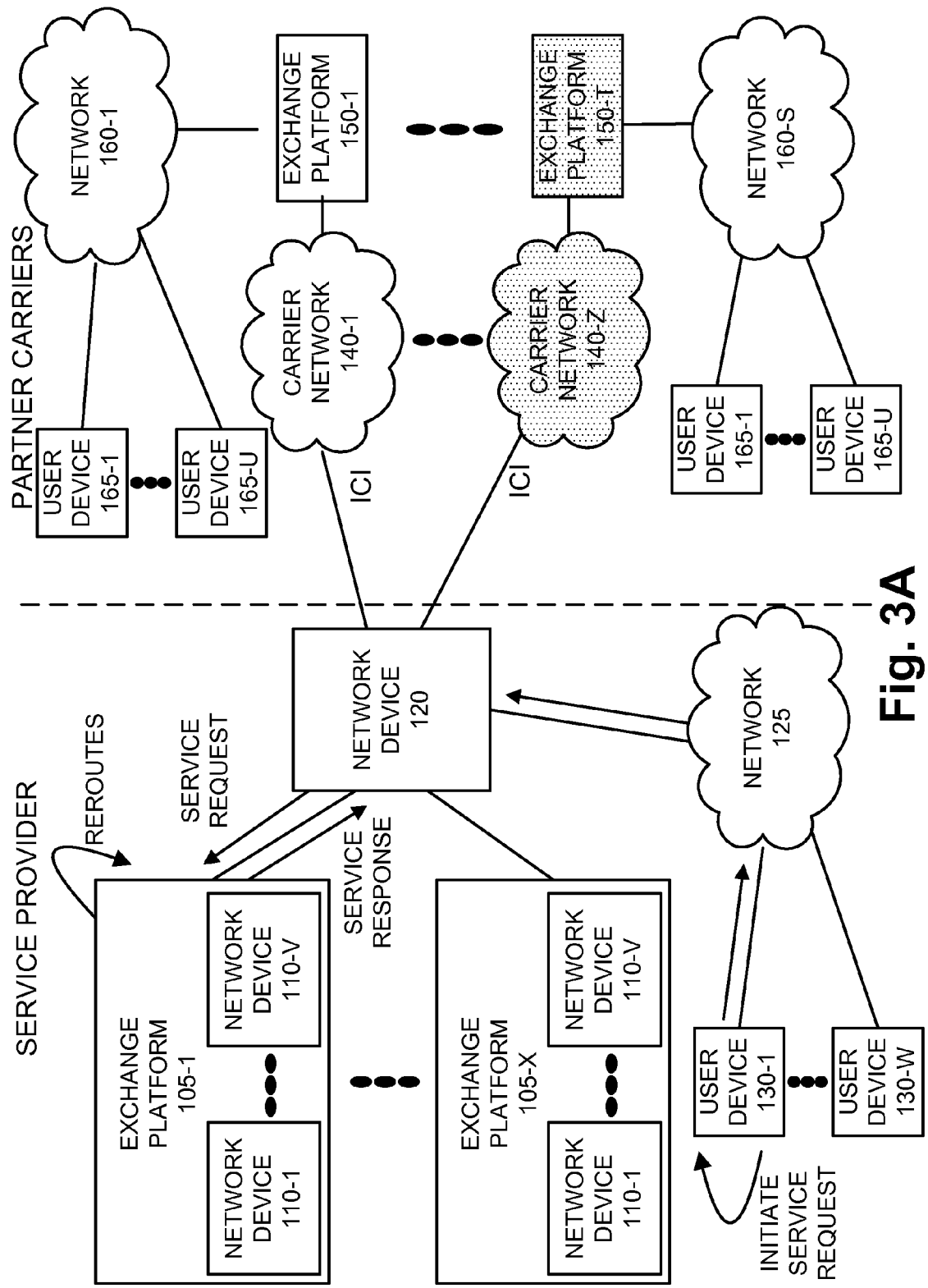
FIGS. 3A-3D illustrate another exemplary process for delivering a multiparty service provided by autonomous network devices in the environment depicted in FIG. 1.

FIGS. 3A-3D illustrate another exemplary process for delivering a multiparty service provided by autonomous network devices. According to an exemplary scenario, assume that exchange platform 150-T is hosting a telepresence video conference that was previously set up. Referring to FIG. 3A, a user initiates, via user device 130-1, a service request to participate in the video conference. The service request is received by network device 120. According to an exemplary implementation, the service request includes, among other data or information, a telephone number and a pin number.

Figure 3B:
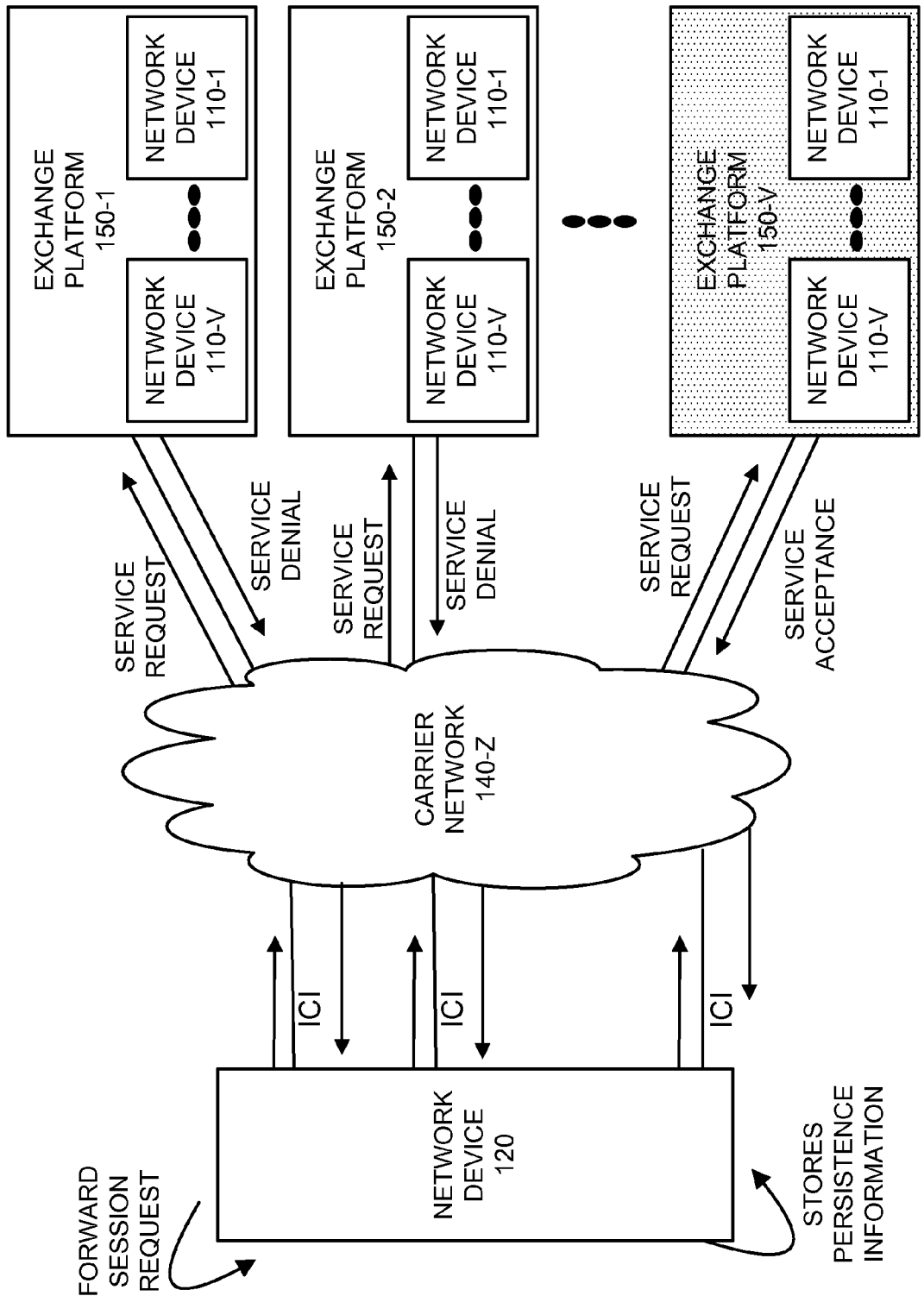

Referring to FIG. 3B, in response to receiving the service request, network device 120 load balances the service request across the exchange platforms 105, as previously described. According to this scenario, assume network device 120 selects exchange platform 105-1 to transmit the service request. According to an exemplary embodiment, exchange platforms 105 include partner-hosted bridging logic that identifies if a video conference is hosted by a partner carrier. For example, the partner-hosted bridging logic identifies that the video conference is hosted by carrier network 140-Z. Exchange platform 105-1 transmits a service response to network device 120 indicating that the video conference is hosted by carrier network 140-Z.

Referring to FIG. 3B, assume that carrier network 140-Z provides access to exchange platforms 150-1 through 150-V. Also, it may be assumed that the video conference is hosted by exchange platform 150-V. As further illustrated in FIG. 3B, network device 120 performs hunt-peck routing process in which session requests are transmitted to exchange platforms 150 to locate the hosting exchange platform 150. As illustrated, in response to receiving a service request, exchange platforms transmit a service response (e.g., a service denial or a service acceptance). In response to receiving the service acceptance message from exchange platform 150-V, network device 120 stores persistence information.

Figure 3C:
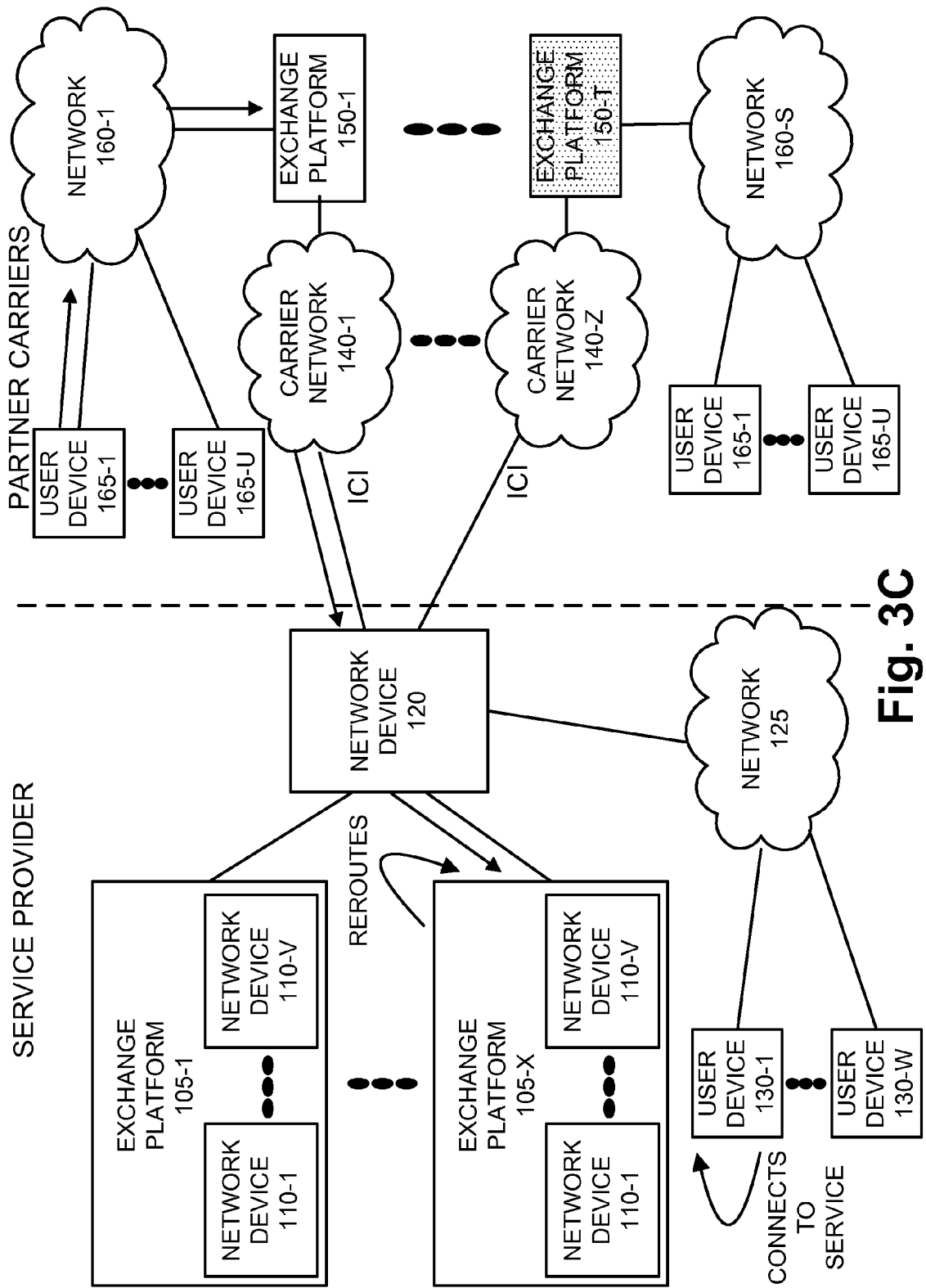
Figure 3D:
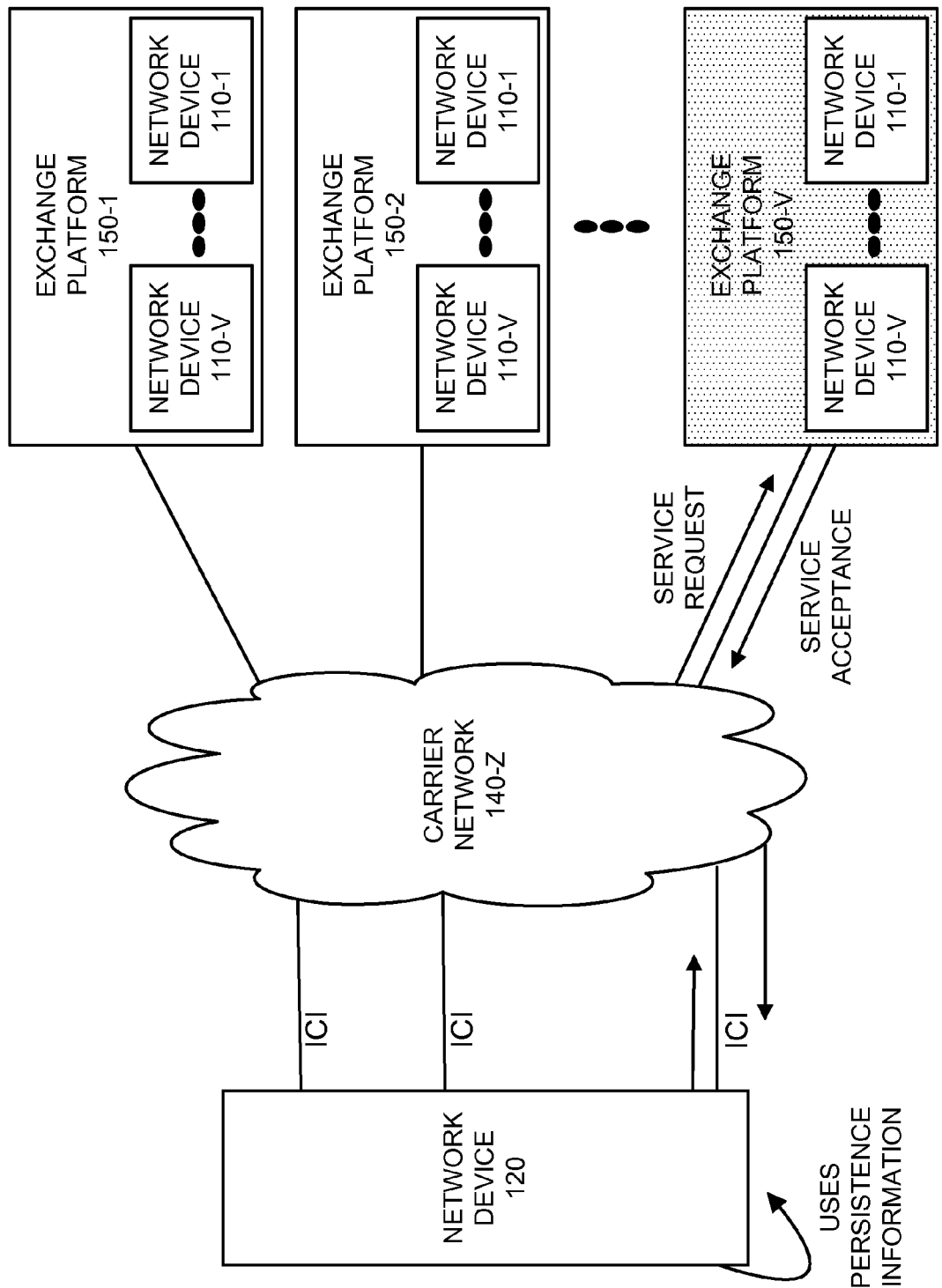

Referring to FIG. 3C, user device 130-1 connects to the multiparty service hosted by exchange platform 150-T. Another user initiates, via user device 165-1, a service request to network device 120 to join the same video conferencing session. Network device 120 load balances the request and transmits the request to exchange platform 105-X. Exchange platform 105-X identifies that the video conference is being hosted by carrier network 140-Z. Exchange platform 105-X transmits a service response to network device 120 indicating that the video conference is hosted by carrier network 140-Z. In response to receiving the service response, network device 120 uses the persistence information and transmits a service request to exchange platform 150-V of carrier network 140-Z, as illustrated in FIG. 3D. Network device 120 receives a service acceptance response. Subsequent service requests attempting to join the video conference may be handled by network device 120 in a similar manner.

According to an exemplary embodiment, network device 120 is configured to store the persistence information in accordance with a user-configured parameter (e.g., a particular time period). According to other exemplary embodiments, network device 120 may be configured to store the persistence information in accordance with other types of parameters. By way of example, persistence information may include the total number of participants in the video conference. For example, the service acceptance response may include information indicating the number of participants. The persistence information may include counter information indicating the number of service requests that successfully joined the video conference. When the counter information is equivalent to the total number of participants, network device 120 may delete the persistence information. In case a participant is unable to participate, network device 120 may delete the persistence information after a time period transpires.

FIG. 4 is a diagram illustrating exemplary components of a device 400 that may correspond to one or more of the devices in environment 100. As illustrated, according to an exemplary embodiment, device 400 includes a processor 405, memory/storage 410 storing software 415, a communication interface 420, an input 425, and an output 430. According to other embodiments, device 400 may include fewer components, additional components, different components, and/or a different arrangement of components than those illustrated in FIG. 4 and described herein.

Processor 405 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., memory/storage 410), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 includes one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 includes an application or a program that provides a function and/or a process. Software 415 may include firmware. Communication interface 420 permits device 400 to communicate with other devices, networks, and/or systems. Communication interface 420 may include a wireless interface and/or a wired interface. Communication interface 420 includes a transmitter, a receiver, and/or a transceiver. Communication interface 420 may operate according to one or multiple protocols, standards, and/or the like.

Input 425 provides an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 provides an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing software 415 stored by memory/storage 410. By way of example, the instructions may be read into memory/storage 410 from another memory/storage 410 or from another device via communication interface 420. The instructions stored by memory/storage 410 may cause processor 405 to perform one or more processes described herein. Alternatively, for example, according to other implementations, device 400 may perform one or more processes described herein based on the execution of hardware (processor 405, etc.), the execution of firmware with hardware, or the execution of software and firmware with hardware.

Figure 5:
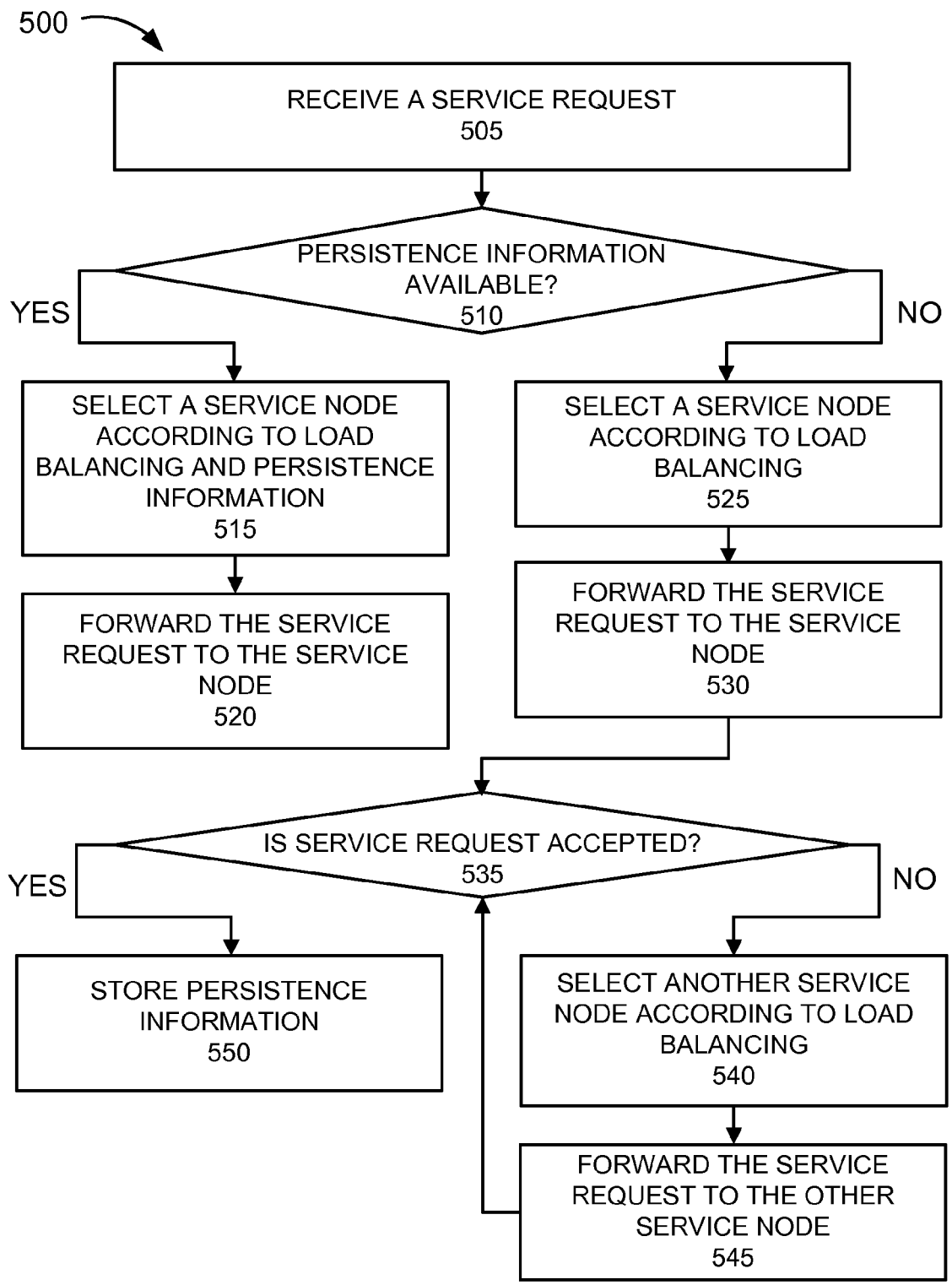
FIG. 5 is a flow diagram illustrating an exemplary process for delivering a multiparty service provided by autonomous network devices.

FIG. 5 is a flow diagram illustrating an exemplary process for delivering a multiparty service provided by autonomous network devices. According to an exemplary embodiment, network device 120 performs process 500. For example, processor 405 may execute software 415 to perform the steps described.

Referring to FIG. 5, in block 505, a service request is received. For example, network device 120 receives a service request for a multiparty service. According to an exemplary implementation, the service request includes information pertaining to a specific instance of the multiparty service. For example, the specific instance may be a specific service session. By way of example, if the multiparty service is a conferencing service, the information pertaining to the specific instance of the multiparty service includes a telephone number and a pin number (e.g., a participation code, a moderator code, etc.).

In block 510, it is determined whether persistence information is available. For example, network device 120 determines whether persistence information is stored that correlates to the service request.

If it is determined that persistence information is available (block 510-YES), then a service node is selected according to load balancing and persistence information (block 515). For example, network device 120 selects an exchange platform 105 and a network device 110 according to load balancing and IP address pools, and the persistence information that indicates the hosting exchange platform 105.

In block 520, the service request is forwarded to the service node. For example, network device 120 transmits the service request to the selected exchange platform 105 and network device 110.

If it is determined that persistence information is not available (block 510-NO), then a service node is selected according to load balancing (block 525). For example, network device 120 selects an exchange platform 105 and a network device 110 according to load balancing and IP address pools.

In block 530, the service request is forwarded to the service node. For example, network device 120 transmits the service request to the selected exchange platform 105 and network device 110.

In block 535, it is determined whether the service request is accepted (block 535). For example, network device 120 receives a service response from exchange platform 105 that is responsive to the service request. Network device 120 determines whether the service request is accepted based on the service response.

If it is determined that the service request is not accepted (block 535-NO), then another service node is selected according to load balancing (block 540). For example, if the service response includes a denial of the service request (e.g., a SIP 404 message), then network device 120 selects another service node according to load balancing. For example, network device 120 selects another exchange platform 105 and another network device 110.

In block 545, the service request is forwarded to the other service node. For example, network device 120 transmits the service request to the selected exchange platform 105 and network device 110. Process 500 then continues to block 535.

If it is determined that the service request is accepted (block 535-YES), persistence information is stored (block 550). For example, network device 120 receives a service response from the other exchange platform 105 that is responsive to the service request. In the case when the service response is accepted, network device 120 stores persistence information pertaining to the successful routing of the service request.

Although FIG. 5 illustrates an exemplary process 500, according to other embodiments, process 500 may include additional operations, fewer operations, and/or different operations than those illustrated in FIG. 5 and described herein. For example, process 500 may include one or more steps pertaining to deleting the persistence information, as previously described.

The foregoing description of embodiments provides illustration, but is not intended to be exhaustive or to limit the embodiments to the precise form disclosed. Accordingly, modifications to the embodiments described herein may be possible. For example, while examples of a user's access to a multiparty service included the scheduling of a multiparty service session (e.g., a conference session). According to other implementations, a previous reservation or a previous schedule may not be necessary. Rather, the multiparty service may be accessed and used on-the-fly by users.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 5, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 405, etc.), a combination of hardware and software (e.g., software 415), a combination of hardware and firmware, or a combination of hardware, firmware, and software. The embodiments have been described without reference to the specific software code since software can be designed to implement the embodiments based on the description herein.

Additionally, an embodiment described herein may be implemented as a non-transitory storage medium that stores data, information and/or instructions, such as a program, a data structure, a program module, an application, etc. For example, a non-transitory storage medium includes one or more of the storage mediums described in relation to memory/storage 410.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:

receiving, by a device, a request to use a multiparty service offered by autonomous devices, wherein a particular one of the autonomous devices has been assigned to provide the multiparty service pertaining to the request, and wherein the request is a first request received to establish a multiparty service session pertaining to the assignment of the particular one of the autonomous devices;

determining, by the device, whether persistence information exists that indicates the particular one of the autonomous devices to which the request is to be routed;

selecting, by the device, one of the autonomous devices to transmit the request in response to determining that persistence information does not exist, and wherein the device does not have information as to which of the autonomous devices has been assigned and is to accept the request;

transmitting, by the device, the request to the one of the autonomous devices based on the selecting;

receiving, by the device, a response from the one of the autonomous devices;

recognizing, by the device, whether the request to use the multiparty service is accepted based on the response;

storing, by the device, persistence information indicating the one of the autonomous devices is the particular one of the autonomous devices and is servicing the request in response to recognizing that the request is accepted; and using, by the device, the persistence information to transmit a subsequent request to use the multiparty service to the particular one of the autonomous devices, wherein the subsequent request pertains to the multiparty service session.

2. The method of claim 1, wherein the multiparty service includes one of a video conferencing service or a telepresence service.

3. The method of claim 1, wherein the persistence information includes a unique identifier indicating a scheduled instance of the multiparty service and a unique device identifier indicating the particular one of the autonomous devices.

4. The method of claim 3, wherein the unique identifier includes a telephone number and a pin number.

5. The method of claim 3, wherein the unique device identifier includes a network address.

6. The method of claim 1, further comprising:
selecting another one of the autonomous devices to transmit another request in response to recognizing that the request is not accepted; and
transmitting the other request to the other one of the autonomous devices.

7. The method of claim 6, wherein the selecting of the one of the autonomous devices and the selecting of the other one of the autonomous devices is based on a load balancing.

8. A device comprising:
communication interfaces;
one or more memories that store instructions; and
one or more processors to execute the instructions to:
receive, via one of the communication interfaces, a request to use a multiparty service offered by autonomous devices, wherein a particular one of the autonomous devices has been assigned to provide the multiparty service pertaining to the request, and wherein the request is a first request received to establish a multiparty service session pertaining to the assignment of the particular one of the autonomous devices;
determine whether persistence information exists that indicates the particular one of the autonomous devices to which the request is to be routed;
select one of the autonomous devices to transmit the request in response to a determination that persistence information does not exist, and wherein the device does not have information as to which of the autonomous devices has been assigned and is to accept the request;
transmit, via another one of the communication interfaces, the request to the one of the autonomous devices;
receive, via the other one of the communication interfaces, a response from the one of the autonomous devices;
recognize whether the request to use the multiparty service is accepted based on the response;
store persistence information indicating the one of the autonomous devices is the particular one of the autonomous devices and is servicing the request in response to a recognition that the request is accepted; and
use the persistence information to transmit a subsequent request to use the multiparty service to the particular one of the autonomous devices, wherein the subsequent request pertains to the multiparty service session.

9. The device of claim 8, wherein the persistence information includes a unique identifier indicating a scheduled instance of the multiparty service and a unique identifier indicating the particular one of the autonomous devices.

10. The device of claim 8, wherein the one or more processors further execute the instructions to:
correlate information included in the request to the persistence information in response to a determination that the persistence information exists; and
select the particular one of the autonomous devices to transmit the request in response to a correlation.

11. The device of claim 10, wherein the information included in the request includes a unique identifier indicating a scheduled instance of the multiparty service, and wherein the particular one of the autonomous devices is scheduled to host the multiparty service pertaining to the request.

12. The device of claim 8, wherein, when selecting, the one or more processors further execute the instructions to:
select the one of the autonomous devices based on a load balancing.

13. The device of claim 8, wherein the one or more processors further execute the instructions to:
select another one of the autonomous devices to transmit another request in response to a recognition that the request is not accepted; and
transmit, via another one of the communication interfaces, the other request to the other one of the autonomous devices.

14. The device of claim 8, wherein the device includes an application delivery controller.

15. The device of claim 8, wherein one or more of the communication interfaces receive requests to use the multiparty service via one or more inter-carrier interconnects.

16. The device of claim 8, wherein the device includes a load balancer.

17. A non-transitory storage medium storing instructions executable by a computational device to:
receive a request to use a multiparty service offered by autonomous devices, wherein a particular one of the autonomous devices has been assigned to provide the multiparty service pertaining to the request, and wherein the request is a first request received to establish a multiparty service session pertaining to the assignment of the particular one of the autonomous devices;
determine whether persistence information exists that indicates the particular one of the autonomous devices to which the request is to be routed;
select one of the autonomous devices to which to transmit the request in response to a determination that persistence information does not exist that is applicable to the request, and wherein the computational device does not have information as to which of the autonomous devices is the particular one of the autonomous device that has been assigned and is to accept the request;
recognize whether the request to use the multiparty service is accepted based on a response from the one of the autonomous devices;
store persistence information indicating the one of the autonomous devices is the particular one of the autonomous devices and is servicing the request in response to a recognition that the request is accepted; and
use the persistence information to select the particular one of the autonomous devices in response to receiving a subsequent request to use the multiparty service, wherein the subsequent request pertains to the multiparty service session.

18. The non-transitory storage medium of claim 17, wherein the persistence information includes a unique identifier that indicates a setup instance of the multiparty service and a unique identifier indicating the particular one of the autonomous devices.

19. The non-transitory storage medium of claim 17, further storing instructions executable by the computational device to:

correlate information included in the request to the persistence information in response to a determination that the persistence information exists; and select the particular one of the autonomous devices to transmit the request in response to a correlation.

20. The non-transitory storage medium of claim 17, further storing instructions executable by the computational device to:

select the one of the autonomous devices based on a load balancing.

* * * * *